(12) United States Patent
Trebichavsky

(10) Patent No.: US 8,534,692 B2
(45) Date of Patent: Sep. 17, 2013

(54) FRONT WHEEL SUSPENSION FOR A SINGLE-TRACK VEHICLE

(76) Inventor: Martin Trebichavsky, Vienna (AT)

( * ) Notice: Subject to any disclaimer, the term of this patent is extended or adjusted under 35 U.S.C. 154(b) by 0 days.

(21) Appl. No.: 13/498,194

(22) PCT Filed: Sep. 29, 2010

(86) PCT No.: PCT/AT2010/000356
§ 371 (c)(1),
(2), (4) Date: Mar. 26, 2012

(87) PCT Pub. No.: WO2011/038431
PCT Pub. Date: Apr. 7, 2011

(65) Prior Publication Data
US 2012/0181774 A1 Jul. 19, 2012

(30) Foreign Application Priority Data
Oct. 2, 2009 (AT) .................................... 1555/2009

(51) Int. Cl.
*B62K 25/04* (2006.01)
(52) U.S. Cl.
USPC ......................................................... 280/277
(58) Field of Classification Search
USPC .................................. 280/277, 276; 180/219
See application file for complete search history.

(56) References Cited

U.S. PATENT DOCUMENTS

| | | | |
|---|---|---|---|
| 2,660,455 A * | 11/1953 | Douglas et al. | ............... 280/277 |
| 4,401,316 A | 8/1983 | Miyakoshi | |
| 4,433,850 A | 2/1984 | Miyakoshi | |
| 4,526,249 A * | 7/1985 | Parker | ........................... 180/219 |
| 4,834,412 A | 5/1989 | Trema | |
| 5,299,820 A | 4/1994 | Lawwill | |
| 5,743,547 A | 4/1998 | Voss | |
| 6,036,211 A | 3/2000 | Nohr | |
| 6,155,370 A * | 12/2000 | Iwai et al. | ..................... 180/222 |
| 2008/0236923 A1 | 10/2008 | Hasegawa | |
| 2008/0296863 A1 | 12/2008 | Heyl | |

FOREIGN PATENT DOCUMENTS

| | | |
|---|---|---|
| CA | 2 453 046 | 6/2005 |
| DE | 4023821 | 1/1992 |
| DE | 94 04 873.8 | 5/1994 |
| DE | 196 25 316 | 1/1998 |

(Continued)

OTHER PUBLICATIONS

Peter Müller et al., "Die innovative Duolever-Vorderradführung der BMW K 1200S-Vom Konzept zur Realisierung," Oct. 31, 2007, pp. 1-10, http://www.tuev-sued.de/uploads/images/11349173338035000193 30/31_reichl_d.pdf.

*Primary Examiner* — Tony Winner
(74) *Attorney, Agent, or Firm* — Jacobson Holman PLLC

(57) ABSTRACT

A front wheel suspension for a single-track vehicle, wherein a front wheel is rotatably supported on a fork-like wheel carrier and the wheel carrier is coupled to a frame and a steering bar of the vehicle connected to a handlebar, wherein the steering bar is coupled to the wheel carrier by a lever connection. The wheel carrier is coupled to at least one frame bar by an articulated connection, and the articulated connection has a substantially vertical pivot axis. The steering bar is comprised of a fork bar partially encompassing the front wheel, which fork bar is coupled to the wheel carrier via the lever connection. Thereby a front wheel suspension having improved characteristics in regard to the suspension, the direct handling of the steering, and a reduction of the load of the frame can be provided.

3 Claims, 1 Drawing Sheet

(56) References Cited

FOREIGN PATENT DOCUMENTS

| | | |
|---|---|---|
| DE | 197 51 252 | 6/1998 |
| DE | 101 23 940 | 11/2002 |
| DE | 102 09 390 | 9/2003 |
| EP | 0 321 803 | 6/1989 |
| EP | 0468138 | 1/1992 |
| EP | 0 469 475 | 2/1992 |
| EP | 0 796 782 | 9/1997 |
| EP | 1 059 227 | 12/2000 |
| EP | 1616780 | 1/2006 |
| FR | 2687976 | 9/1993 |
| FR | 2832121 | 5/2003 |
| JP | 63-145186 | 6/1988 |
| WO | 2007/115668 | 10/2007 |
| WO | 2007/131590 | 11/2007 |

\* cited by examiner

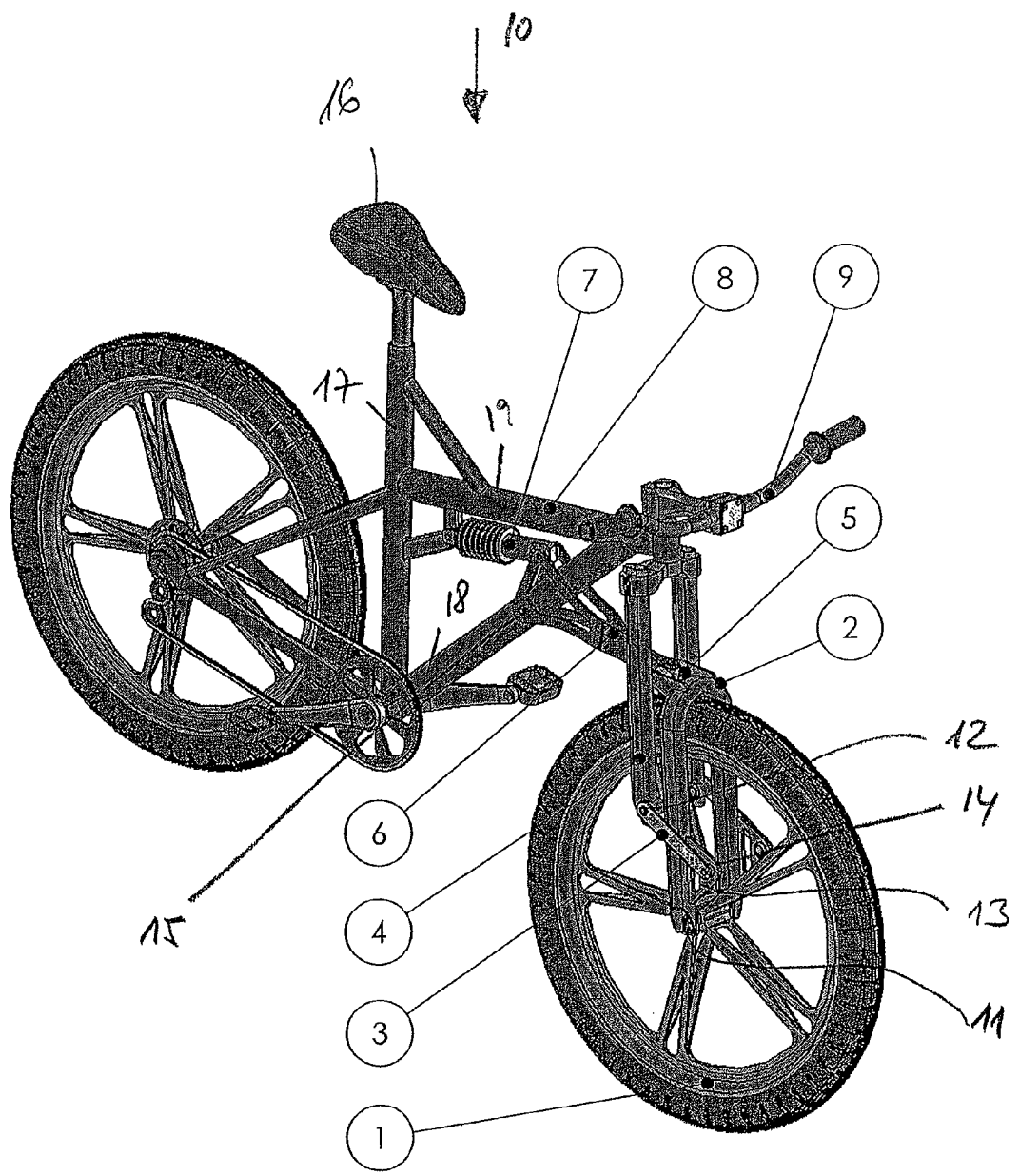

FRONT WHEEL SUSPENSION FOR A SINGLE-TRACK VEHICLE

This is a national stage of PCT/AT2010/000356 filed Sep. 29, 2010 and published in German, which has a priority of Austria No. A 1555/2009 filed Oct. 2, 2009, hereby incorporated by reference.

FIELD OF THE INVENTION

The present invention relates to a front wheel suspension for a single-track vehicle, in particular a motorcycle, bicycle, or the like, wherein a front wheel is rotatably supported on a fork-like wheel carrier and the wheel carrier is or can be coupled to a frame and a steering bar of the vehicle connected to a handlebar, wherein the steering bar is coupled to the wheel carrier by means of a lever connection, wherein the wheel carrier is coupled to at least one frame bar by means of an articulated connection separate from the wheel carrier, and wherein the articulated connection has a substantially vertical pivot axis substantially in a line between the articulated mounting of the steering bar on the frame and the support of the front wheel on the wheel carrier and substantially parallel to the steering bar.

PRIOR ART

In addition to a common and known articulation of a front wheel to a substantially rigid wheel carrier formed by a fork bar and directly coupled or coupleable to a handlebar via an appropriate steering bar, it is known to provide such a fork-like wheel carrier with telescopic arms in order to achieve a damping effect in the region of the front wheel suspension for a single-track vehicle.

Furthermore, suspensions for the front wheel of a single-track vehicle are known, which do without telescopic forks in order to, for instance, avoid, in particular, a poor response characteristic of a spring suspension in a linear telescopic guide and a high load on the chassis or frame associated therewith. In this context, a parallelogram handlebar, which comprises two longitudinal handlebars that are mounted on the frame of the single-track vehicle carrier, is, for instance, known. In order to ensure steerability, a front wheel carrier is each attached to the front ends of the longitudinal handlebars, e.g. by means of a ball joint. The transmission of the steering torque between a handlebar fixed to the frame and the front wheel carrier takes place via a scissor handlebar, which again comprises a ball joint and two additional pivot bearings. The spring element acts directly on a lower longitudinal handlebar and is supported on the frame, wherein it is immediately apparent that the multitude of handlebars and joints to be used calls for an extremely complex construction. Similar solutions are, for instance, described in DE 40 23 821 A1, DE 102 09 390 A1, DE 10 2006 016 183 A1, DE 101 23 940 A1, WO 2007/115668 A1 or EP 0 321 803 (IT 2320687). The disadvantages, as already pointed out above, generally include extremely complex structures and the associated high weights as well as a substantially indirect steering.

From FR 2 687 976 A1, a vehicle has become known, wherein a front-wheel suspension is realized on each side by a lower swing arm that is configured as a lever connection associated with a spring and damping system. In addition, U.S. Pat. No. 5,299,820 A discloses a modified embodiment of a front wheel suspension, wherein several swing arms or lever-like elements are combined with shock absorbers on different levels.

Furthermore, EP 0 796 782 A2 and CA 2 453 046 A1 show different configurations of rear wheel suspensions, wherein forces are introduced into a shock-absorbing element. Due to the fact that no steerability of a rear wheel is provided, such suspensions for the rear wheels of a two-wheel vehicle, in particular a bicycle, cannot be directly compared to, or combined with, the above-identified configurations of front wheel suspensions.

Another group of solutions, which renounce telescopic forks, suggest a parallelogram handlebar that is directly attached to a handlebar carrier, in which context it can, for instance, be referred to WO 2007/131590 A1, DE 197 51 252 A1 or U.S. Pat. No. 4,433,850. Those embodiments, in particular, involve the drawbacks of high kinematic forces acting in longitudinal carriers and large mass moments of inertia being occurring about the longitudinal axes.

A further group of proposals doing without telescopic forks comprise concepts using double longitudinal handlebars, wherein the front wheel is mounted in a wheel hub and steering is indirectly performed by the aid of tie rods, in which context it is, for instance, referred to U.S. Pat. No. 4,834,412, FR 2 601 641 A1, DE 196 25 316 A1 or EP 0 469 475 A1. Those embodiments again involve the drawbacks of high constructive expenditures, indirect steering and, in particular, a limited steering lock. In addition, all of the above-mentioned embodiments involve the disadvantage that, due to their constructions, they have limited ranges of spring, which are particularly insufficient in single-track off-road vehicles such as motocross bikes or all-terrain bikes or mountain bikes or the like.

Embodiments of a front wheel suspension for a single-track vehicle similar to the kind mentioned initially can, moreover, be taken, for instance, from EP 1 616 780 A1, EP 0 468 138 A1, FR 2 832 121 A1, EP 1 059 227 A2, JP 63 145 186 A, US 2008/236923 A1, DE 94 04 873 U1, U.S. Pat. No. 5,743,547 A, DE 31 53 297 C2 and U.S. Pat. No. 6,036,211 A.

SUMMARY OF THE INVENTION

The present invention aims to provide a front wheel suspension for a single-track vehicle of the initially defined kind, which minimizes or eliminates the above-mentioned disadvantages and problems of known embodiments and, in particular, provides an improved spring suspension at an improved steerability and, in particular, a reduced movable and unsprung mass as well as an improved introduction and distribution of forces.

To solve these objects, a front wheel suspension for a single-track vehicle of the initially defined kind is essentially characterized in that the steering bar is comprised of a fork bar partially encompassing the front wheel, which fork bar, on its ends facing away from the handlebar, is coupled to the fork-like wheel carrier via the lever connection. Due to the fact that a lever connection for coupling the steering bar to the fork-like wheel carrier and an articulated connection of the wheel carrier to at least one frame bar, which connection is separated from the wheel carrier, are provided for the front wheel suspension, it has become possible to provide, in particular, a structurally simple embodiment that complies with the above-mentioned requirements, above all as regards an improved spring suspension at a minimum response delay time, a direct steering, and the provision of a low unsprung mass. In addition, it has become possible by the construction according to the invention to minimize, or distribute to different points on the frame, the loads acting on the frame and to be transmitted, so as to also reduce the demands placed on the frame or chassis of the single-track vehicle. In order to provide a sufficiently large steering lock at a simultaneously low mass moment of inertia about the steering axle, it is proposed that the articulated connection has a substantially vertical pivot axis substantially in a line between the articulated mounting of the steering bar on the frame and the support of the front wheel on the wheel carrier and substantially parallel to the steering bar. To further improve the introduction and distribution of the forces to be introduced into the frame, it is proposed according to the invention that the steering bar is comprised of a fork bar partially encompassing the front wheel, which fork bar, on its ends facing away from the handlebar, is coupled to the fork-like wheel carrier via the lever connection.

In order to achieve the desired direct steering and the appropriate stiffness of the suspension, it is, moreover, proposed that the lever connection engages at the wheel carrier at a distance from the mounting of the axle of the front wheel, as in correspondence with a further preferred embodiment of the suspension according to the invention.

To provide an accordingly safe and reliable mounting of the wheel carrier and to introduce into the frame forces acting on the front wheel, it is proposed according to a further preferred embodiment that the coupling of the wheel carrier to at least one frame bar is effected via an articulated lever connection.

In order to achieve an appropriate spring effect at low unsprung masses while, at the same time, providing large spring travels as are particularly sought and required for off-road vehicles, it is additionally proposed according to a further preferred embodiment that the articulated connection comprised of an articulated lever connection is formed by a swing arm pivotally hinged to a frame bar as well as a pivotable suspension strut coupled thereto and hinged to a further frame bar, in particular a frame bar receiving a saddle.

In order to achieve an, in particular kinematic, progressive suspension strut operation, it is, moreover, proposed that the spring travel of the suspension strut is adjustable, as in correspondence with a further preferred embodiment of the front wheel suspension according to the invention.

In order to provide a front wheel suspension for different purposes of use and enable the simple adjustability of different parameters of the front wheel suspension according to the invention, it is, moreover, preferably proposed that displacement paths of the lever connection and/or the articulated connection are configured to be adjustable and limitable.

The front wheel suspension according to the invention allows for the achievement of, in particular, the following, recapitulated advantages at a simply designed structure, which is thus also readily applicable for series production:
- a minimum response delay time of the spring mounting;
- a direct steering;
- a small mass moment of inertia about the steering axle;
- a high stiffness of the suspension;
- a low unsprung mass;
- a break dive compensation, kinematically adjustable;
- a low structural load on the chassis or frame;
- as low as possible a change in the caster and in the steer angle during deflection;
- large spring travels for off-road vehicles;
- a kinematically progressive suspension strut operation, easily adjustable;
- a sufficiently large ground clearance in any driving state, particularly during cornering.

SHORT DESCRIPTION OF THE DRAWING

In the following, the invention will be explained in more detail by way of an exemplary embodiment of an off-road bicycle or mountain bike schematically illustrated in the drawing. In this respect, it should be noted that the construction of the front wheel suspension according to the invention can also be directly used or employed in single-track vehicles other than bicycles, such as motorcycles, mopeds or the like.

DETAILED DESCRIPTION OF PREFERRED EMBODIMENTS

From the bike illustrated in the FIGURE, which is generally denoted by 10, it is apparent that a front wheel 1 is mounted on a fork-shaped wheel carrier 2, an axis of the mounting of the front wheel 1 on the ends of the fork-like wheel carrier 2 being denoted by 11.

On the one hand, the fork-shaped wheel carrier 2 on its two bars is each connected via a lever connection or lower swing arm 3 to a steering fork bar 4 at least partially encompassing the front wheel 1, wherein the steering bar 4 is coupled to a handlebar denoted by 9 in a manner known per se. In addition to the articulated coupling of the lever connection 3 in the region of the axis 12 on the lower ends of the steering bar 4, a further articulated connection on an element 13 coupled to the fork-like wheel carrier 2 is denoted by 14.

In addition, the fork-like wheel carrier 2, on its end facing away from the axle 11 mounting the front wheel 1, is coupled to the frame generally denoted by 8 via a joint 5 particularly designed as an angle joint, by a further articulated lever connection or upper swing arm generally denoted by 6. Besides the articulated or pivotable coupling about an axis 15 on a substantially obliquely extending frame bar 18, the articulated lever connection 6 is coupled to further frame bars via an additional suspension strut 7. In the embodiment illustrated in the FIGURE, coupling is effected to an upper or substantially horizontally extending frame bar 19 and to a frame bar 17 receiving a saddle 16.

The length of the suspension strut 7 and the effective spring travel of the suspension strut 7 are adjustable in this case.

In addition, the lever and joint travels of all lever and articulated connections 3, 6 are adjustable and limitable, especially for different purposes of use.

Instead of the embodiment illustrated in the FIGURE, the articulated mounting of individual articulated connections and, in particular, the separate or additional articulated connections can be provided on different articulation points and, in particular, on mutually separated frame bars.

The invention claimed is:

1. A front wheel suspension for a single-track vehicle wherein a front wheel is rotatably supported on a fork wheel carrier through an axle and the wheel carrier is coupled to a frame and a steering bar of the vehicle connected to a handlebar, the frame including a first frame bar in connection with a second frame bar and the second frame bar receiving a saddle; wherein the steering bar is coupled to the wheel carrier by means of a lever connection; wherein the wheel carrier is coupled to the frame by means of an articulated connection separate from the wheel carrier; and wherein the articulated connection has a substantially vertical pivot axis substantially along a line from an articulated mounting of the steering bar on the frame to the support of the front wheel on the wheel carrier, and the substantially vertical pivot axis being substantially parallel to the steering bar; wherein the steering bar is comprised of a fork bar partially encompassing the front wheel, which fork bar, on its ends facing away from the handlebar, is coupled to the fork wheel carrier via a lever connection; wherein the articulated connection between the wheel carrier and the frame is an articulated lever connection; and wherein the articulated lever connection is formed by a swing arm pivotally hinged to the first frame bar and a pivotable suspension strut coupled thereto and hinged to the second frame bar.

2. The front wheel suspension according to claim 1, wherein the lever connection engages at the wheel carrier at a distance from a mounting of the axle of the front wheel.

3. The front wheel suspension according to claim 1, wherein a spring travel of the suspension strut is adjustable.

* * * * *